United States Patent
Selanders et al.

(10) Patent No.: US 11,736,925 B2
(45) Date of Patent: *Aug. 22, 2023

(54) LOW-POWER MOBILE TELEPHONY ALERT SYSTEM

(71) Applicant: KASIEL SOLUTIONS INC., Saskatoon (CA)

(72) Inventors: Serese Allison Marie Selanders, Saskatoon (CA); David Squires, Port Angeles, WA (US); Andre Doucette, Saskatoon (CA); Jean-Sébastien Langlois, Quebec (CA); Maxime Cavanagh Pouliot, Quebec (CA); Kent Davidson, Calgary (CA); Benoit Moffet-Bédard, Quebec (CA); Eric Dusablon, Quebec (CA); Cédric St-Amand, Quebec (CA)

(73) Assignee: KASIEL SOLUTIONS INC., Saskatoon (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/535,612

(22) Filed: Nov. 25, 2021

(65) Prior Publication Data

US 2022/0086618 A1     Mar. 17, 2022

Related U.S. Application Data

(63) Continuation of application No. 16/337,247, filed as application No. PCT/IB2017/056037 on Sep. 29, 2017, now Pat. No. 11,218,861.

(Continued)

(51) Int. Cl.
*H04W 4/90* (2018.01)
*H04W 76/14* (2018.01)
*H04W 4/80* (2018.01)

(52) U.S. Cl.
CPC ............... *H04W 4/90* (2018.02); *H04W 4/80* (2018.02); *H04W 76/14* (2018.02)

(58) Field of Classification Search
CPC ......... H04W 4/90; H04W 4/80; H04W 76/14; Y02D 30/70; A44C 25/00
(Continued)

(56) References Cited

U.S. PATENT DOCUMENTS 9,444,945 B1 * 9/2016 Verma .................... H04M 11/04
9,520,050 B2   12/2016 Ros
(Continued)

OTHER PUBLICATIONS

International Search Report and Written Opinion, dated Jan. 25, 2018, by ISA/CA, re PCT International Patent Application No. PCT/IB2017/056037.

(Continued)

*Primary Examiner* — Hirdepal Singh
(74) *Attorney, Agent, or Firm* — Perry + Currier Inc.

(57) ABSTRACT

A low-power mobile telephony alert system and an alert device. The alert device has a communication interface configured to establish a low-power communication link with a mobile device for transmitting status data to the mobile device, and a telephony-enabled communication linked with the mobile device for initiating telephony from the mobile device while in locked mode. The alert device can initiate a status check request to third party contact devices before escalating to connect to the mobile device from locked mode to initiate telephony to an emergency service. The alert device is compact and can be incorporated into an article of jewelry or a wearable loop member.

13 Claims, 11 Drawing Sheets

Related U.S. Application Data

(60) Provisional application No. 62/402,190, filed on Sep. 30, 2016.

(58) Field of Classification Search
USPC .................................................. 455/404.1
See application file for complete search history.

(56) References Cited

U.S. PATENT DOCUMENTS

| | | | |
|---|---|---|---|
| 9,756,454 B1 | 9/2017 | Kelley | |
| 2013/0331058 A1* | 12/2013 | Harvey | H04W 4/90 |
| | | | 455/404.2 |
| 2017/0359674 A1 | 12/2017 | Nair et al. | |
| 2018/0070290 A1* | 3/2018 | Breaux | G06F 3/0227 |
| 2019/0103011 A1 | 4/2019 | Ros | |

OTHER PUBLICATIONS

ISA/CA, International Preliminary Report on Patentability, dated Apr. 11, 2019, re PCT International Patent Application No. PCT/IB2017/056037.

* cited by examiner

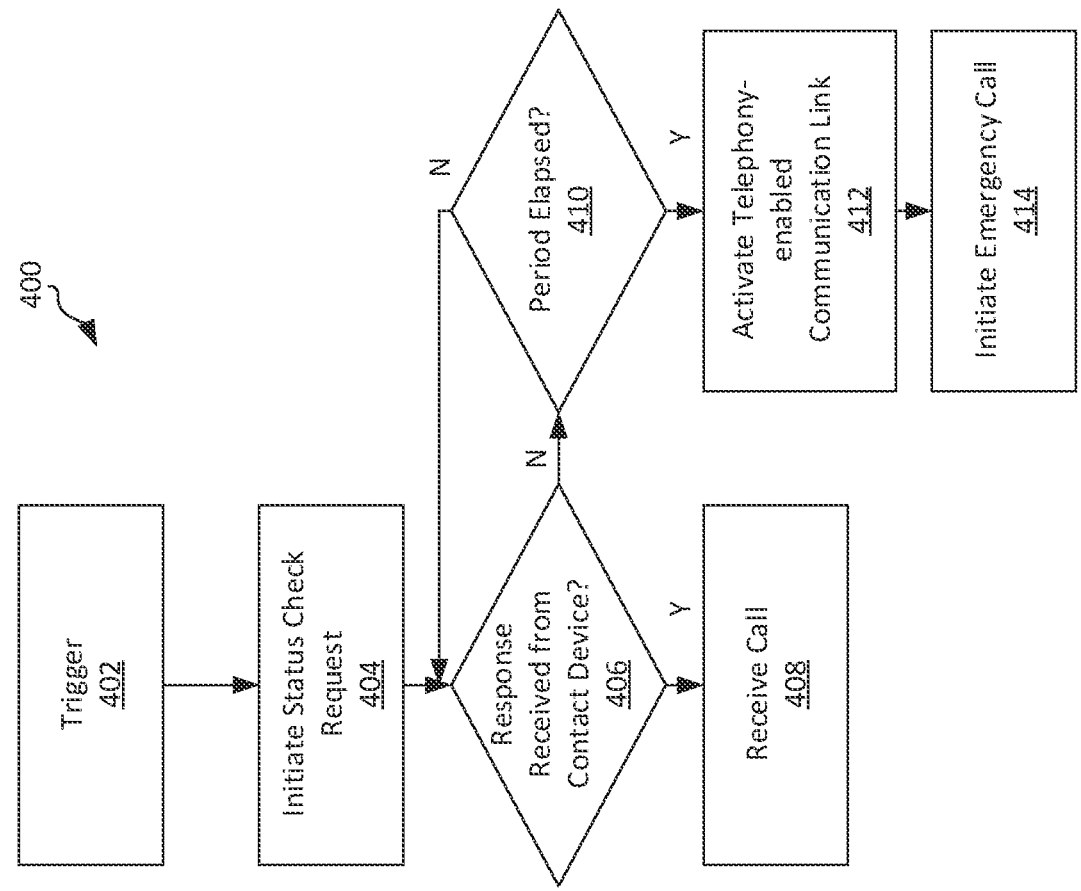
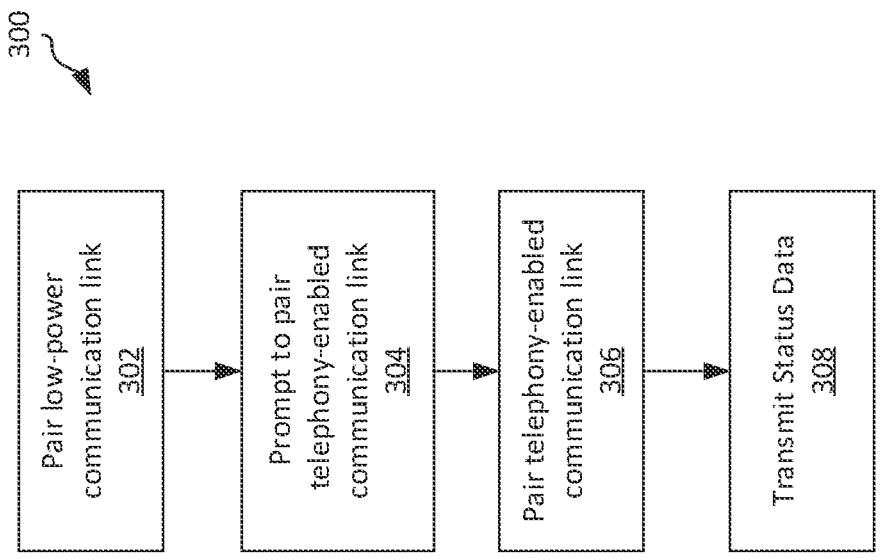
FIG. 5B
FIG. 5A

LOW-POWER MOBILE TELEPHONY ALERT SYSTEM

CROSS-REFERENCE TO RELATED APPLICATIONS

This application is a continuation of 16/337,247, filed Mar. 27, 2019, which is a 371 of international PCT/IB2017/056037, filed Sep. 29, 2017, which claims priority to U.S. 62/402,190, filed Sep. 30, 2016, the entirety of which is incorporated herein by reference.

FIELD

The present disclosure relates generally to alert systems, and in particular to mobile telephony alert systems.

BACKGROUND

Alert systems, including personal emergency response systems, and the like, provide individuals with a means for obtaining assistance in times of need. There is particularly a need for mobile alert systems for individuals who work in remote areas, or who work alone in precarious work environments, so that such individuals can call for assistance remotely when in distress. Elderly or infirm individuals may have similar needs.

Although many individuals store everyday mobile devices such as smart phones, tablets, and other communication devices on their persons, such mobile devices are often inaccessible to an individual in dire times of need. Thus, an alert system typically includes a dedicated alert device stored on an individual's person with a button which, when operated in times of distress, provides means for putting the individual in communication with an emergency dispatch service.

Although some everyday mobile devices stored on a person include telephony capability, such devices are often restricted from initiating telephony when in locked mode. Thus, many implementations of existing alert systems comprise two units: a mobile alert device, and a stationary base unit for providing telephony service. A distressed individual can activate the mobile alert device, which causes a stationary base, typically stored in a home, to make a telephone connection with a dispatch service. The individual may then speak through the alert device, cause speech to be transmitted through the base unit, through a telephone system, and ultimately to a dispatch service. A limitation of such an alert system is that its functionality is limited by the operating range of the connection between the mobile alert device and the stationary base unit. Furthermore, the necessity of the additional hardware to allow for speech from the mobile alert device makes the mobile alert device cumbersome.

Other alert systems seek to overcome the deficiencies of the limited range and mobility of alert devices relying on a stationary base unit by providing all of the communication hardware that was once stored in both the base unit and the alert device in a single device. Such devices are often bulky, highly noticeable and obtrusive.

A further limitation of the previously mentioned alert systems is that the distressed individual can generally only be put in communication with an emergency dispatch service, with no less drastic alternative for situations where an emergency dispatch service is not appropriate. An individual may find oneself in a distressful situation requiring assistance, but may not be willing to go to the drastic length of calling upon an emergency dispatch service, and therefore may decide against using such an alert system at all.

SUMMARY

The present disclosure relates to a low-power mobile telephony alert system. The present disclosure sets forth an alert device that includes a communication interface configured to establish a low-power communication link with a mobile device for transmitting status data to the mobile device, and a telephony-enabled communication link with the mobile device for initiating telephony from the mobile device while in locked mode. The alert device can initiate a status check request to third party contact devices before escalating to initiate telephony to an emergency service. The alert device is compact and can be incorporated into an article of jewelry or a wearable loop member.

According to an aspect of the disclosure, a low-power mobile telephony alert system is provided. The system includes a mobile device, at least one third party contact device, an emergency service, and an alert device for initiating telephony from the mobile device in locked mode to the emergency service.

According to an aspect of the disclosure, an alert device for initiating telephony from a mobile device in locked mode includes a communication interface. The communication interface is configured to establish a first paired connection with the mobile device, the mobile device running a status data monitoring application, the first paired connection includes a low-power communication link having privileged access to the status data monitoring application for recording status data from the alert device to the mobile device in locked mode, the low-power communication link configured for continuous low-energy transmission of status data from the alert device to the status data monitoring application, to establish a second paired connection with the mobile device, the second paired connection includes a telephony-enabled communication link having privileged access to initiate telephony from the mobile device in locked mode, the telephony-enabled communication link configured for initiating telephony from the mobile device in response to recognition of a trigger represented in the status data from the alert device, and to transmit the status data from the alert device to the mobile device, via the first paired connection, for collection by the status data monitoring application. The alert device includes a memory storage unit for storing programming instructions and the status data, and a processor in communication with the communication interface and memory storage unit. The processor is configured to recognize a trigger represented in the status data, and, responsive to recognition of the trigger, initiate, via one of the first paired connection and the second paired connection, a status check request from the mobile device to at least one third party contact device, the status check request having an expiry rule, identify satisfaction of the expiry rule of the status check request, and, responsive to satisfaction of the expiry rule, connect to the mobile device from locked mode via the second paired connection; and initiate, via the second paired connection, telephony from the mobile device to a third-party emergency service.

The communication interface may include a dual-mode module configured to establish the first paired connection and the second paired connection.

The alert device may further include a motion sensor, wherein the status data includes motion sensor data, and wherein the trigger includes the status data indicating inactivity of the alert device for a pre-determined length of time.

The alert device may further include a motion sensor, wherein the status data includes motion sensor data, and wherein the trigger includes the status data indicating a disturbance in the motion sensor data.

The alert device may further include an alert button, and wherein the trigger includes the status data indicating a pressed state of the alert button.

The alert device may include a wearable article having an opening for providing concealed access to the alert button of the alert device.

The wearable article may include a fascia portion and a pendant portion releasably attachable to enclose the alert device, the fascia portion providing ornamentation to the alert device, and the pendant portion concealing the alert button and providing a loop for wearing the alert device.

The expiry rule may include lapsation of a countdown timer.

According to another aspect of the disclosure, a method for initiating telephony from a mobile device in locked mode using an alert device includes pairing the alert device with the mobile device via a first paired connection, the mobile device running a status data monitoring application, the first paired connection includes a low-power communication link having privileged access to the status data monitoring application for recording status data from the alert device to the mobile device in locked mode, the low-power communication link configured for continuous low-energy transmission of status data from the alert device to the status data monitoring application, pairing the alert device with the mobile device via a second paired connection, the second paired connection includes a telephony-enabled communication link having privileged access to initiate telephony from the mobile device in locked mode, the telephony-enabled communication link configured for initiating telephony from the mobile device in response to recognition of a trigger represented in the status data from the alert device, transmitting status data from the alert device to the mobile device, via the first paired connection, for collection by the status data monitoring application, responsive to recognition of the trigger represented in the status data, initiating, via one of the first paired connection and the second paired connection, a status check request from the mobile device to at least one third party contact device, the status check request having an expiry rule, responsive to satisfaction of the expiry rule of the status check request, connecting to the mobile device from locked mode via the second paired connection, and initiating, via the second paired connection, telephony from the mobile device to a third-party emergency service.

Pairing the alert device with the mobile device via a second paired connection may involve generating a link key to be stored on the alert device and mobile device to authenticate the second paired connection.

The expiry rule may include lapsation of a countdown timer.

The status data may include motion sensor data from a motion sensor on the alert device, and wherein recognition of the trigger represented in the status data involves recognizing inactivity of the alert device for a pre-determined length of time.

The status data may include motion sensor data from a motion sensor on the alert device, and wherein recognition of the trigger represented in the status data involves recognizing a disturbance in the motion sensor data.

The status data may include pressed state data from an alert button on the alert device, and wherein recognition of the trigger represented in the status data includes a pressed state of the alert button.

Other features and advantages of the system and alert device are described more fully below.

BRIEF DESCRIPTION OF THE DRAWINGS

Preferred embodiments will now be described, by way of example only, with reference to the attached Figures, wherein:

FIG. 5A is a flowchart of a method for establishing telephony-enabled, low-power monitoring of the alert device of the system of FIG. 1;

FIG. 5B is a flowchart of a method for alerting third parties of distress from the mobile device of FIG. 1 in locked mode;

DETAILED DESCRIPTION

Figure 1:
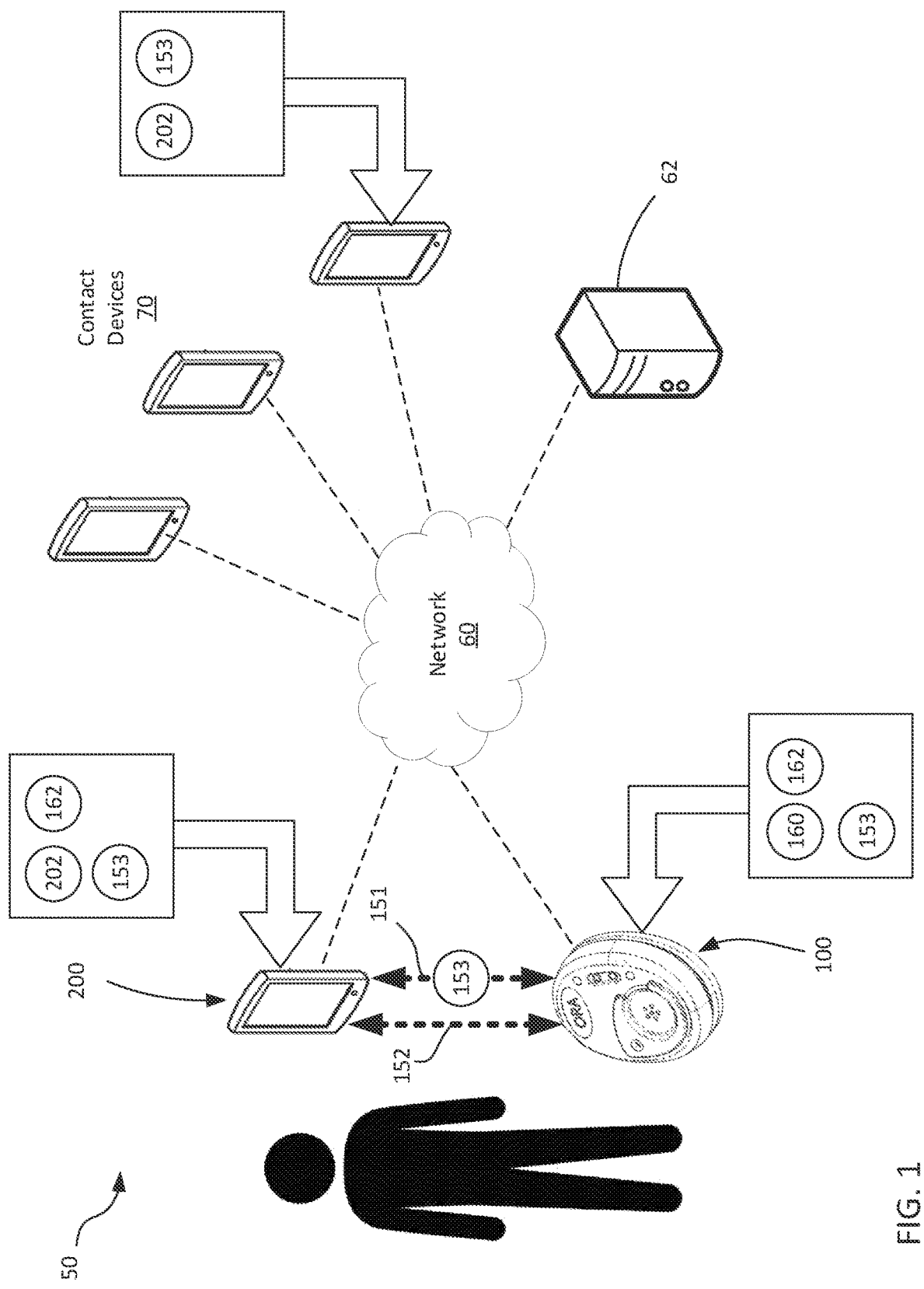
FIG. 1 is a schematic diagram of mobile telephony alert system including an alert device and a mobile device stored on a person.

The present disclosure relates to a low-power mobile telephony alert system. The system includes an alert device to be worn or carried by an individual. The alert device is in communication with a mobile device, such as a smartphone other mobile communication device having telephony capability, also carried by the individual. When a trigger indicating that the individual is distressed is recognized, the alert device can cause the mobile device to initiate a status check request to third party contact devices, and can initiate telephony from the mobile device to an emergency service.

The alert device uses a low-power communication link to transmit status data from the alert device to the mobile device. The status data can include, for example, motion sensor data, battery data, heartrate, blood pressure, or other physiological data, or button press data, which may indicate whether the wearer of the alert device is in distress. The low-power communication link is generally continuously active to be used for monitoring purposes.

Many mobile devices, however, restrict the ability for low-power communication links to initiate telephony while the mobile device is in locked mode. For security reasons, it may be desirable for mobile devices to restrict telephony from continuously-active communication links while the mobile device is in locked mode. Thus, low-power communication links are not reliable for initiating telephony on some of such restricted mobile devices.

The alert device therefore uses a telephony-enabled communication link to use the telephony capability of the mobile device while the mobile device is in locked mode, thereby overcoming such restrictions against low-power communication links. The telephony-enabled communication link is made active only where a trigger is detected from the status data transmitted by the alert device. For example, the telephony-enabled communication link is activated when the status data indicates that an emergency button has been pressed on the alert device.

Thus, the alert device maintains a low-power communication link with the mobile device that is generally continuously active for monitoring purposes, and the alert device can activate a telephony-enabled communication link to initiate telephony to make an emergency call while the mobile device is in locked mode. Thus, an alert device which leverages the telephony capability of the mobile device and obviates the need for telephony hardware on the alert device is provided. Furthermore, the alert device can initiate status check requests from the mobile device to third party contact devices as a less drastic form calling for distress before initiating telephony to an emergency service. Further still, the alert device can be made compact and incorporated into an article of jewelry or a wearable loop member for discrete wear.

Non-limiting embodiments of the system and the alert device are presented in the following Figures. For convenience, reference numerals may be repeated (with or without an offset) to indicate analogous components or features.

FIG. 1 is a schematic diagram depicting a mobile telephony alert system 50, according to a non-limiting embodiment. The system 50 includes an alert device 100 to be stored on an individual's person, and a mobile device 200 to be stored on an individual's person or nearby. The system 50 further includes a network 60, one or more third party contact devices 70, and one or more emergency services 62.

The mobile device 200 is in communication with one or more third party contact devices 70, and one or more emergency service 62, via one or more computers or telecommunications networks, shown as network 60, which can include a wireless cellular data network, a Wi-Fi network, a local-area network, a wide-area network (WAN), a Bluetooth pairing or connection, the internet, a virtual private network (VPN), a combination of such, and similar.

In the present embodiment, the mobile device 200 includes a smart phone running an operating system such as, for example, Android®, iOS®, Windows® mobile, BB 10, or similar. In other embodiments, the mobile device 200 includes a tablet computer, a personal digital assistant (PDA), laptop, or other mobile computing device with telecommunications capability.

In the present embodiment, the contact device 70 similarly includes a smart phone running an operating system such as, for example, Android®, iOS®, Windows® mobile, BB 10, or similar. In other embodiments, the contact device 70 includes a tablet computer, a personal digital assistant (PDA), laptop, or other mobile computing device with telecommunications capability.

In the present embodiment, emergency service 62 includes a third party emergency service having telecommunications means for coordinating emergency response teams. However, in other embodiments, emergency service 62 may include an emergency dispatch service.

The alert device 100 is in communication with the mobile device 200 via a first paired connection 151. The first paired connection 151 includes a low-power communication link configured for generally continuous low-energy transmission of status data 153 from the alert device 100 to the mobile device 200. In some embodiments, the first paired connection 151 includes a Bluetooth Low Energy (BLE) connection. In such embodiments, the alert device 100 may be the peripheral device and the mobile device 200 may be the central device.

The alert device 100 is also in communication with the mobile device 200 via a second paired connection 152. The second paired connection 152 includes a telephony-enabled communication link having privileged access to initiate telephony from the mobile device 200 in locked mode. In some embodiments, the second paired connection 152 includes a Bluetooth Classic (BTC) connection. In such embodiments, the alert device 100 is the master in the master-slave BTC connection, and the second paired connection 152 includes a hands-free profile (HFP) providing privileged access for initiation of telephony. As part of the pairing process of establishing the second paired connection 152, a link key 162 is stored by both the alert device 100 and the mobile device 200 for authenticating the paired connection.

The mobile device 200 is loaded with status data monitoring application 202, running as software, and each contact device 70 is similarly loaded with status data monitoring application 202, running as software, for facilitating communication, and for collection of status data 153 transmitted from the alert device 100. Status data 153 is also collected by application 202 and recorded in mobile device 200 for later use, and in the present embodiment, is similarly recorded on contact device 70 for monitoring by a third party contact. In the present embodiment, the mobile device 200 and contact devices 70 each run the same application 202, which may be configured to operate for the distinct role of the mobile device 200 or the contact device 70, as discussed below with reference to FIGS. 4-6. In other embodiments, however, the contact devices 70 may run distinct software applications, and status data 153 may not be recorded on a contact device 70 for monitoring, provided the contact devices 70 can still receive status check requests and have telephony capability, as described below.

The alert device 100 is loaded with firmware 160, which controls transmission of status data 153 from the alert device 100 to mobile device 200 via first paired connection 151. Firmware 160 further controls detection of triggers which may indicate the wearer of the alert device 100 is in distress, and for initiating status request checks and telephony from mobile device 200, as discussed below with reference to FIGS. 4-6.

Figure 2:
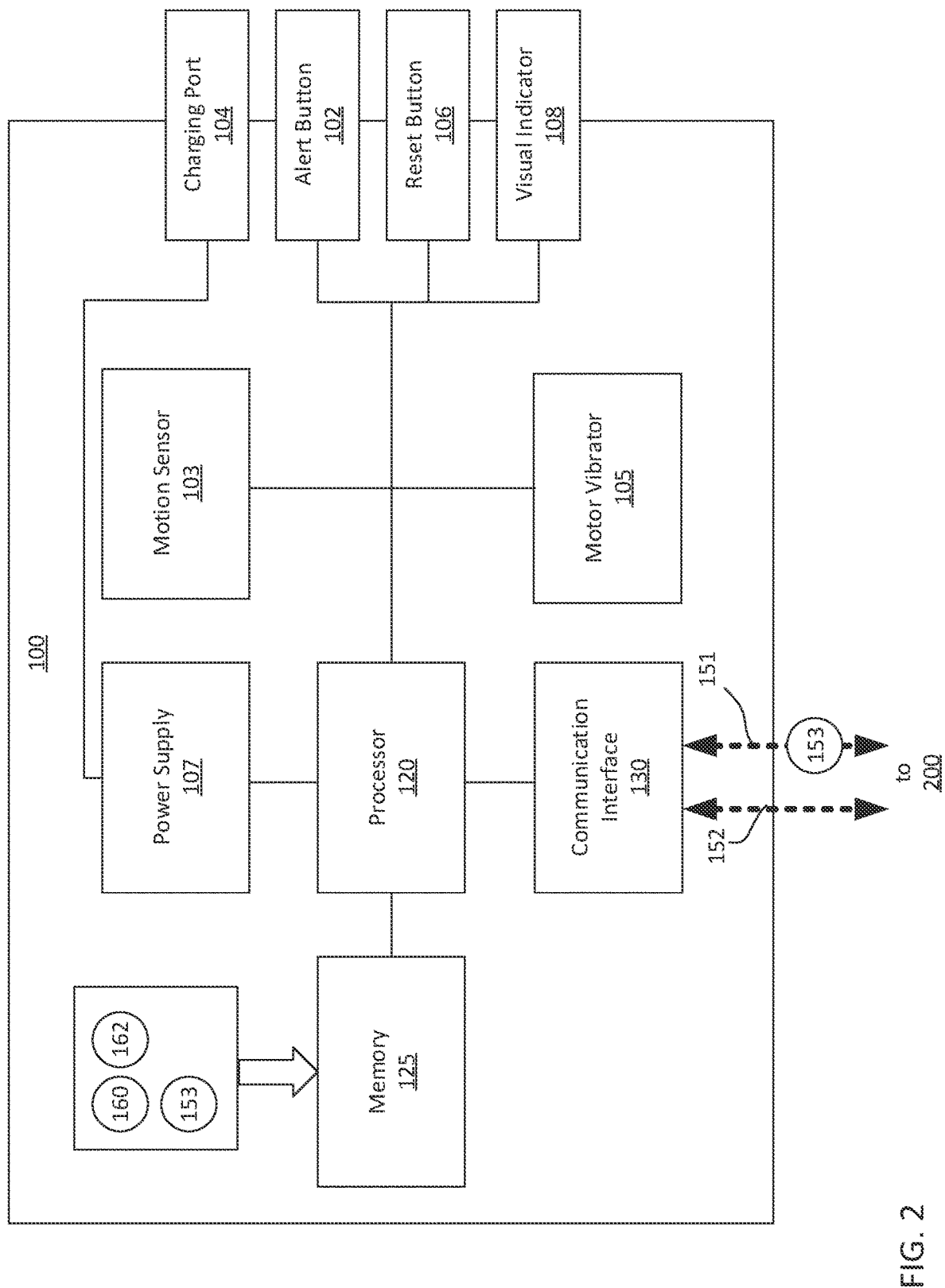
FIG. 2 is a block diagram of the components of the alert device of the system of FIG. 1.

FIG. 2 is a block diagram of the components of the alert device 100, according to a non-limiting embodiment. In the present embodiment, the alert device 100 includes a processor 120 which communicates with a communication interface 130.

In the present embodiment, the processor 120 includes a microcontroller with a floating-point unit (FPU), an integrated circuit, a serial peripheral interface, and a general purpose I/O utilizing pulse-width modulation. However, in other embodiments, the computation of processor 120 may be achieved by other means, such as, for example, a state machine, a logic gate array, an application-specific integrated circuit (ASIC), a system-on-a-chip (SOC), a field-programmable gate array (FPGA), or similar, capable of executing, whether by software, hardware, firmware, or a combination of such, to carry out the methods discussed in greater detail below.

In embodiments where the first paired connection 151 and second paired connection 152 comprise BLE and BTC connections respectively, the communication interface 130 includes at least one Bluetooth module capable of establishing a hands-free profile for initiating telephony.

In the present embodiment, the communication interface 130 includes a dual-mode BLE/BTC module, such as a CC2564B Dual-mode Bluetooth controller, or a STM32F4 (ST) microcontroller unit. In other embodiments, however, communication interface 130 may comprise separate BLE and BTC modules.

The processor 120 also communicates with motion sensor 103 and motor vibrator 105. The motion sensor 103 may comprise an accelerometer or gyroscope or a combination of such or similar, to gather data about the motion of alert device 100 as part of status data 153. Disturbances or lengthy pauses in motion data may indicate a trigger that the wearer of the alert device 100 is in distressed, as discussed in greater detail below. The motor vibrator 105 can provide haptic feedback to the individual to indicate that the alert button 102 has been pressed, or that battery power is low, for example.

The alert device 100 further includes a power supply 107, such as a battery, which is charged via charging port 104. In other embodiments where power supply 107 includes a battery, power supply 107 may be charged via kinetic energy harvester means, solar cells, or may be substituted for an external power source, such as a power connection with the mobile device 200, an AC or DC connection, or otherwise.

The processor 120 further communicates with alert button 102, visual indicators 108, and reset button 106. Activation of the alert button 102 by the wearer may indicate a trigger that the wearer of the alert device 100 is in distressed, as discussed in greater detail below.

Thus, in the present embodiment, status data 153 includes motion sensor data collected from motion sensor 103, the battery life of power supply 107, a pressed (or unpressed) state of alert button 102, and the signal strengths of paired connections 151, 152, from communication interface 130, which may serve as an analog for the distance from alert device 100 to mobile device 200. In other embodiments in which other sensors are onboard alert device 100, additional information related to the state of alert device 100 may be included in status data 153. For example, the alert device 100 may include a microphone or other sound recorder (not shown), and sound data may be included in status data 153. As another example, alert device 100 may include a heart-rate monitor (not shown), and heartrate data may be included in status data 153. Similarly, where the alert device 100 may include a blood pressure sensor, and blood pressure data may be included in status data 153.

Visual indicator 108 communicates state information about the alert device 100 to the wearer. In the present embodiment, visual indicator 108 built into alert button 102 and is located beneath a translucent layer 109 above the alert button 102. In the present embodiment, the visual indicator 108 includes several tri-colour LEDs. In other embodiments, state information can be communicated to an individual via a single LED, a multi-colour LED, a series of LEDs, a speaker, motor vibrator 105, or otherwise.

The factory reset button 106 can be used to reset the alert device 100 to factory settings.

The alert device 100 further includes a memory storage unit 125 having firmware 160 and in communication with processor 120 to configure processor 120 to carry out the methods discussed in greater detail below. In brief, firmware 160 which controls transmission of status data 153 from the alert device 100 to mobile device 200 via first paired connection 151. Firmware 160 further controls detection of triggers which may indicate the wearer of the alert device 100 is in distress, and for initiating status request checks and telephony from mobile device 200, as discussed below with reference to FIGS. 4-6. In the present embodiment, status data 153 is stored on memory storage unit 125 temporarily before being transmitted to mobile device 200. In some embodiments, status data 153 may be stored in memory storage unit 125 for a short period of time before status data 153 is transmitted to mobile device 200. However, in other embodiments, status data 153 may be streamed directly to mobile device 200 without prolonged storage on memory storage unit 125.

Figure 3:
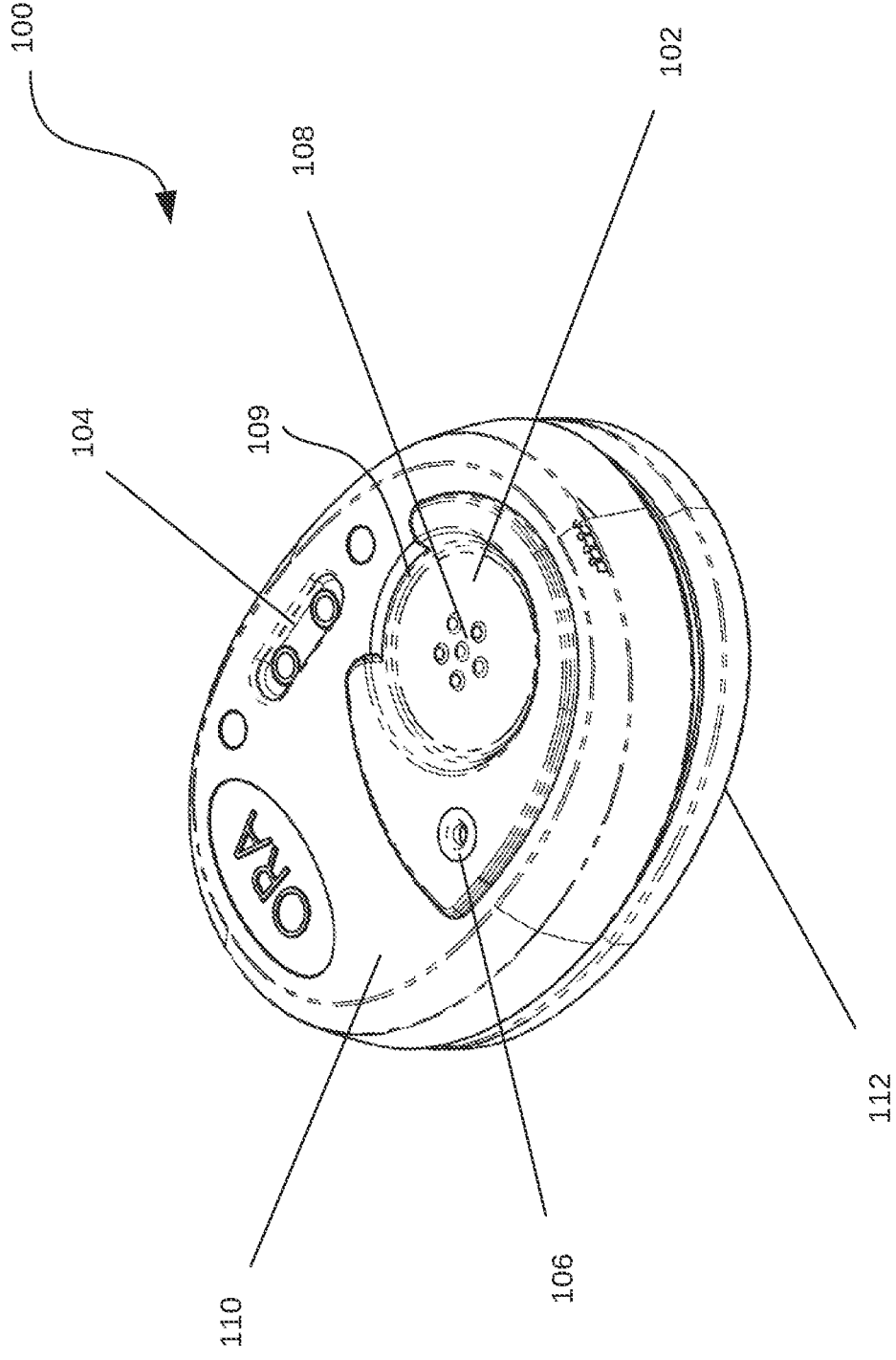
FIG. 3 is a perspective view of the alert device of the system of FIG. 1 showing the rear chassis of the alert device.

FIG. 3 is a perspective view of the alert device 100, according to a non-limiting embodiment. FIG. 3 illustrates the peripheral components, including the alert button 102 having translucent layer 109, the wired charging port 104, reset button 106 and visual indicator 108. The alert device 100 further includes rear chassis 110 featuring the peripheral components of the alert device 100, and front chassis 112 opposite the rear chassis 110. The rear chassis 110 and front chassis 112 are shaped to fit into a piece of jewelry or other article, as described with reference to FIGS. 7A and 7B below, for discreet storage on an individual's person. The alert button 102 is depressed into the rear chassis 110 to inhibit accidental pressing.

Figure 4:
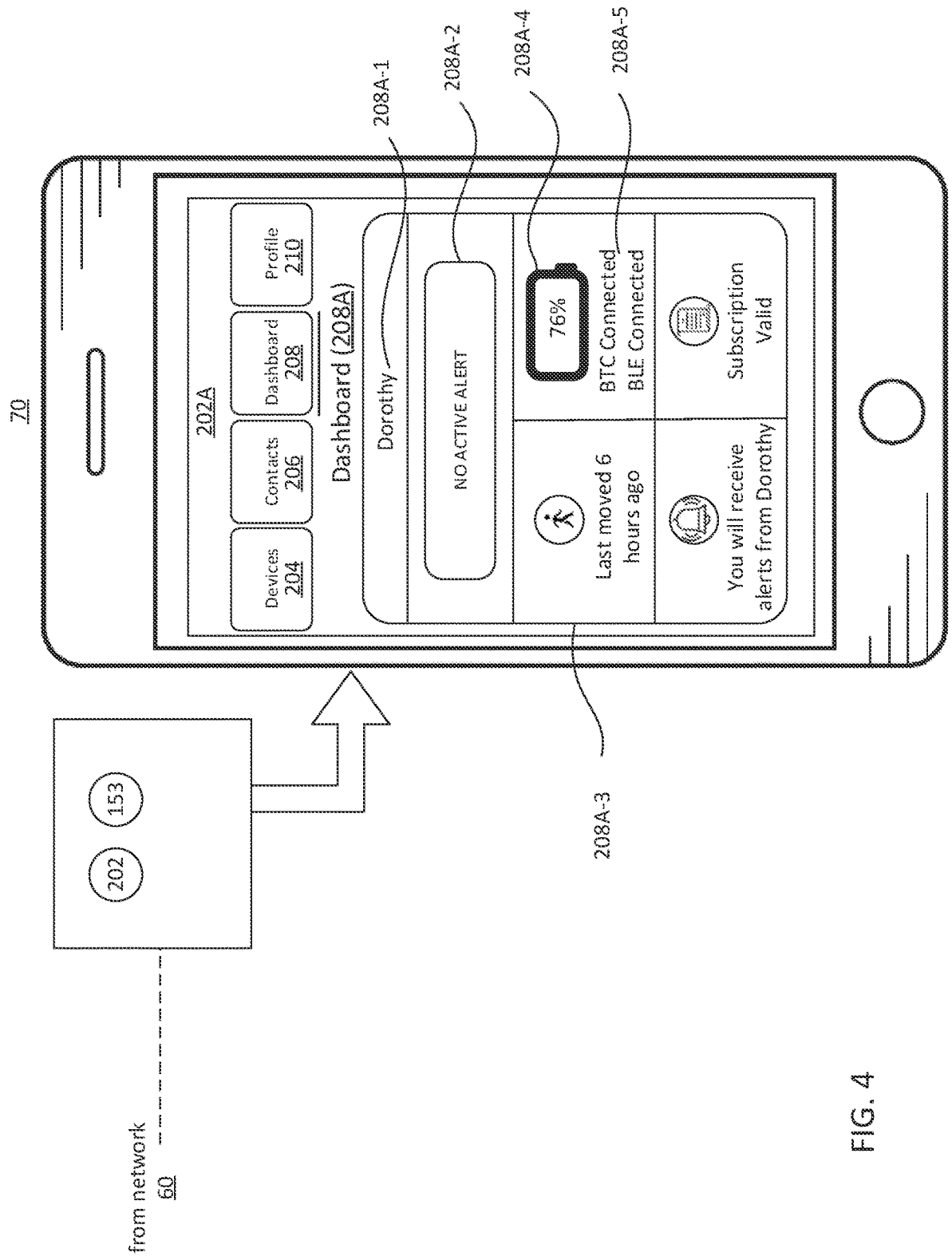
FIG. 4 depicts a screen capture of a status data monitoring application running on the mobile device of FIG. 1.

FIG. 4 depicts a screen capture of application 202 running on a contact device 70, according to a non-limiting embodiment. The contact device 70 receives status data from a mobile device 200 across network 60 for monitoring by the contact device 70.

The application 202 includes a user interface 202A having a devices button 204, a contacts button 206, a dashboard button 208, and a profile button 210. The screen capture shown in FIG. 4 indicates an active dashboard page 208A, which a user may select by pressing dashboard button 208.

The dashboard page 208A includes an identifier 208A-1 for indicating the wearer of the alert device 100 being monitored. The dashboard page 208A further includes panels or icons for displaying indications of status data 153, including an alert panel 208A-2, a motion panel 208A-3, a battery life icon 208A-4, and a connectivity icon 208A-5. The alert panel 208A-2 can indicate whether an active alert caused by a trigger in the status data 153 is present. The motion panel 208A-3 can indicate when motion data from the motion sensor 103 last indicated that the wearer of the alert device 100 moved, and may indicate whether a significant disturbance (e.g. a fall) was detected by the motion sensor 103. Battery life icon 208A-4 indicates the remaining battery life of the alert device 100. Connectivity icon 208A-5 indicates whether the alert device 100 is connected by paired connections 151, 152, in the present embodiment a BLE and BTC connection respectively, to the wearer's mobile device 200.

By pressing the devices button 204, a user may access a devices page (not shown), which allows a user to view an inventory of alert devices 100 which contact device 70 is monitoring.

By pressing the contacts button 206, a user may access a contacts page (not shown). When accessed from a mobile device 200, the contacts page indicates a list of third party contacts having contact devices 70. A user of a mobile device 200 may then select various options such as which contact devices 70 will receive status check requests, as discussed below. or which contact devices 70 will receive a telephone call. When accessed from a contact device 70, the contacts page indicates a list of wearers of alert devices 100 being monitored, for whom the contact device 70 will be alerted if an alert is triggered.

By pressing profile button 210, a user may access a profile page (not shown), which allows a user to adjust personal preferences of the application 202 and the like.

It is emphasized that interface 202A is shown as an example only. The panels and icons may be rearranged, and some pages may be omitted entirely, provided the application 202 can be used to monitor status data 153 and perform the functions of the methods described herein. Where application 202 is running on a contact device 70, for example, the devices page may be omitted. As a further example, when application 202 is running on a contact device 70, the contacts page may be omitted in place of a plurality of dashboard pages 208A between which a user may switch.

In some embodiments, a mobile device 200 may transmit its location data, determined via global positioning systems (GPS), Wi-Fi location tracking, or other location tracking systems, to a contact device 70. Thus, where a contact device 70 is alerted that the wearer of alert device 100 is in distress, the user of contact device 70 may verify the location of the wearer of the alert device 100 for rendering assistance.

FIG. 5A is a flowchart of a method 300 for establishing telephony-enabled, low-power monitoring of an alert device 100, according to a non-limiting embodiment. The method 300 is described as performed by a system and device discussed herein, but this is not limiting and the method can alternatively be performed by other systems and/or devices. It is to be emphasized that the blocks of method 300 need not be performed in the exact sequence as shown.

At block 302, the mobile device 200 connects with the alert device 100 to establish first paired connection 151. As discussed above, the first paired connection 151 includes a low-power communication link configured for generally continuous low-energy transmission of status data 153 from the alert device 100 to the mobile device 200. In some embodiments, the first paired connection 151 includes a Bluetooth Low Energy (BLE) connection. In such embodiments, the alert device 100 is the peripheral device advertising the BLE connection and the mobile device 200 is the central device.

At block 304, mobile device 200 connects with the alert device 100 to establish first paired connection 151, the mobile device 200 is prompted by application 202 to pair the alert device 100 with the mobile device 200 via second paired connection 152. In an example embodiment in which the mobile device 200 is an iOS device and the second paired connection 152 includes a BTC connection, the mobile device 200 prompts the user to establish the BTC connection.

At block 306, the alert device 100 is paired with the mobile device 200 via second paired connection 152. As discussed above, the second paired connection 152 includes a telephony-enabled communication link having privileged access to initiate telephony from the mobile device 200 in locked mode. In the present embodiment, the second paired connection 152 includes a Bluetooth Classic (BTC) connection, and the alert device 100 is the master in the master-slave BTC connection, and the second paired connection 152 includes a hands-free profile (HFP) enabling initiation of telephony. As part of the pairing process of establishing the second paired connection 152, a handshake occurs where a link key 162 is generated and stored by both the alert device 100 and the mobile device 200 for authenticating the paired connection.

At block 308, status data 153 is transmitted from alert device 100 to mobile device 200 via first paired connection 151. As a low-power connection, status data 153 can be transmitted with low energy costs on a regular basis without undue drain on battery power of the alert device 100 or mobile device 200.

When an individual is determined to be in distress, whether by the status data 153 including information regarding the pressed state of alert button 102 indicating that the alert button 102 has been pressed, that the wearer of the alert device 100 has not moved for a pre-determined period of time, that the wearer may have experienced a fall, or another trigger apparent from status data 153 and recognized by firmware 160 on alert device 100 as a trigger, a method for alerting third parties is initiated, as discussed with respect to FIG. 5B below.

FIG. 5B is a flowchart of a method 400 for alerting third parties of distress from the mobile device 200 in locked mode, according to a non-limiting embodiment. The method 400 is described as performed by a system and device discussed herein, but this is not limiting and the method can alternatively be performed by other systems and/or devices.

Generally, the alert device 100 causes the mobile device 200 to send status check request to a plurality of the individual's contact devices 70 as a push notification launched by the application 202 running on contact device 70. The status check request invites select personal contacts to respond to the request by calling the distressed individual at the mobile device 200. The application 202 running on the mobile device 200, and the application 202 running on the contact device 70, can be associated such that the contact device 70 contains the telephone number of the mobile device 200 to call when so requested.

A telephone connection through network 60 puts the wearer of the alert device 100 in contact with the contact device 70 through telephony of the mobile device 200 so that assistance may be rendered.

If no personal contact having a contact device 70 responds within a pre-determined length of time, then the alert device 100 uses the second paired connection 152 to cause the mobile device 200 to call an emergency service 62. The wearer of the alert device 100 can then communicate through the mobile device 200 to obtain emergency assistance.

At block 402, a trigger is recognized in the status data 153 sent from the alert device 100 to the mobile device 200. A trigger may include an indication that the alert button 102 has been pressed, that the wearer of the alert device 100 has reported inactivity of the alert device 100 for a pre-determined length of time, that the wearer may have experienced a fall, or another trigger apparent from status data 153 and recognized by firmware 160 on alert device 100 as a trigger. For example, recognition that the alert device 100 has not reported movement by motion sensor data from motion sensor 103 in one hour may be a trigger indicating that the wearer of the alert device 100 is likely in distress. In other embodiments, a disturbance in motion sensor data from motion sensor 103, such as that indicating a fall, can indicate the individual is likely in distress.

Where motion sensor data from motion sensor 103 is monitored for triggers, motion data that is sent to the mobile device 200 may be periodically sent to contact devices 70 so that a personal contact may monitor the individual's level of activity.

To save battery life, motion sensor data from motion sensor 103 may be transmitted to mobile device 200 in periodic batches. For example, motion sensor data may be transmitted only about every 180 seconds.

At block 404, after recognition of a trigger, a status check request is sent to contact devices 70. In the present embodiment, the request is sent as a push notification from application 202 on contact device 70, and is sent to a plurality of contacts which the wearer of the alert device 100 has selected via application 202 on mobile device 200. The status check request message invites the contact to communicate with the distressed individual by, for example, making a telephone call to the individual. In the present embodiment, the alert device 100 causes the mobile device 200 to send the status check request message by ordering the mobile device 200 to do so via the first paired connection 151. In some embodiments, the second paired connection 151 may be used to initiate the status check request.

At block 406, it is determined whether a contact has responded to the status check request. For example, a contact device 70 may have telephoned the distressed individual at mobile device 200. If a contact has telephoned the distressed individual, and the wearer answers the call, the call from the contact is received at block 408. The contact may then render assistance to the distressed individual. Furthermore, having been contacted by a third party contact device 70, the mobile device 200 may send a cancel command to the alert device 100 to end method 400 so that further steps to initiate telephony are not taken where assistance has already been rendered. If no response has been received, block 410 is executed.

At block 410, it is determined whether an expiry rule has been satisfied. In the present embodiment, the expiry rule is determination of whether a pre-determined length of time has elapsed during which no response to the status check request has been received. If the period has not elapsed, block 406 is executed again. If the pre-determined length of time has elapsed, it is identified that the expiry rule has been satisfied, and block 412 is executed. For example, the expiry rule may be satisfied upon lapsation of a countdown timer, for example if a 2-minute countdown timer elapses before a response to the status check request is received.

At block 412, after satisfaction of the expiry rule, the second paired connection 152 is made active to connect to the mobile device 200. In embodiments in which the mobile device 200 is restricted from initiating telephony when in locked mode, such as an iOS device in locked or sleep mode, a low-power communications link such as BLE does not have privileged access to initiate telephony from the mobile device 200. A telephony-enabled communication having hands-free profile capability, such as a BTC connection, however, does have privileged access to initiate telephony from the mobile device 200 in locked mode.

At block 414, the alert device 100 causes the mobile device 200 to call an emergency service 62. In the example embodiment shown, the second paired connection 152, as a BTC link, allows the alert device 100, which is master of the BTC link, to connect to the mobile device 200 in order to initiate a telephone call to the emergency service 62. The wearer of the alert device 100 can then communicate through the mobile device 200 to the emergency assistance.

In the present embodiment, at least blocks 402, 404, 410, 412, and 414 are coded via firmware 160 into the alert device 100. Instructions for these blocks being coded in firmware 160, rather than solely in application 202, is one way for the alert device 100 to alert third parties of a distress, even where application 202 is not actively running on the mobile device 200. In other embodiments, including those in which the application 202 is actively running on mobile device 200, any combination of blocks 402, 404, 406, 410, 412, and 414, may be performed by the mobile device 200.

In some embodiments, firmware 160 may contain instructions for proceeding directly to blocks 412 and 414 for initiating a telephone call via second paired connection 152 to an emergency service 62, without executing blocks 404 through 410, foregoing the status check request procedure.

In still other embodiments, block 414 may comprise calling a selected contact from the contact devices 70 prior to, or in lieu of, making a call to an emergency service 62. In some of such embodiments, several calls may be made to several contact devices 70, prior to, or in lieu of, making a call to an emergency service 62.

Figure 6:
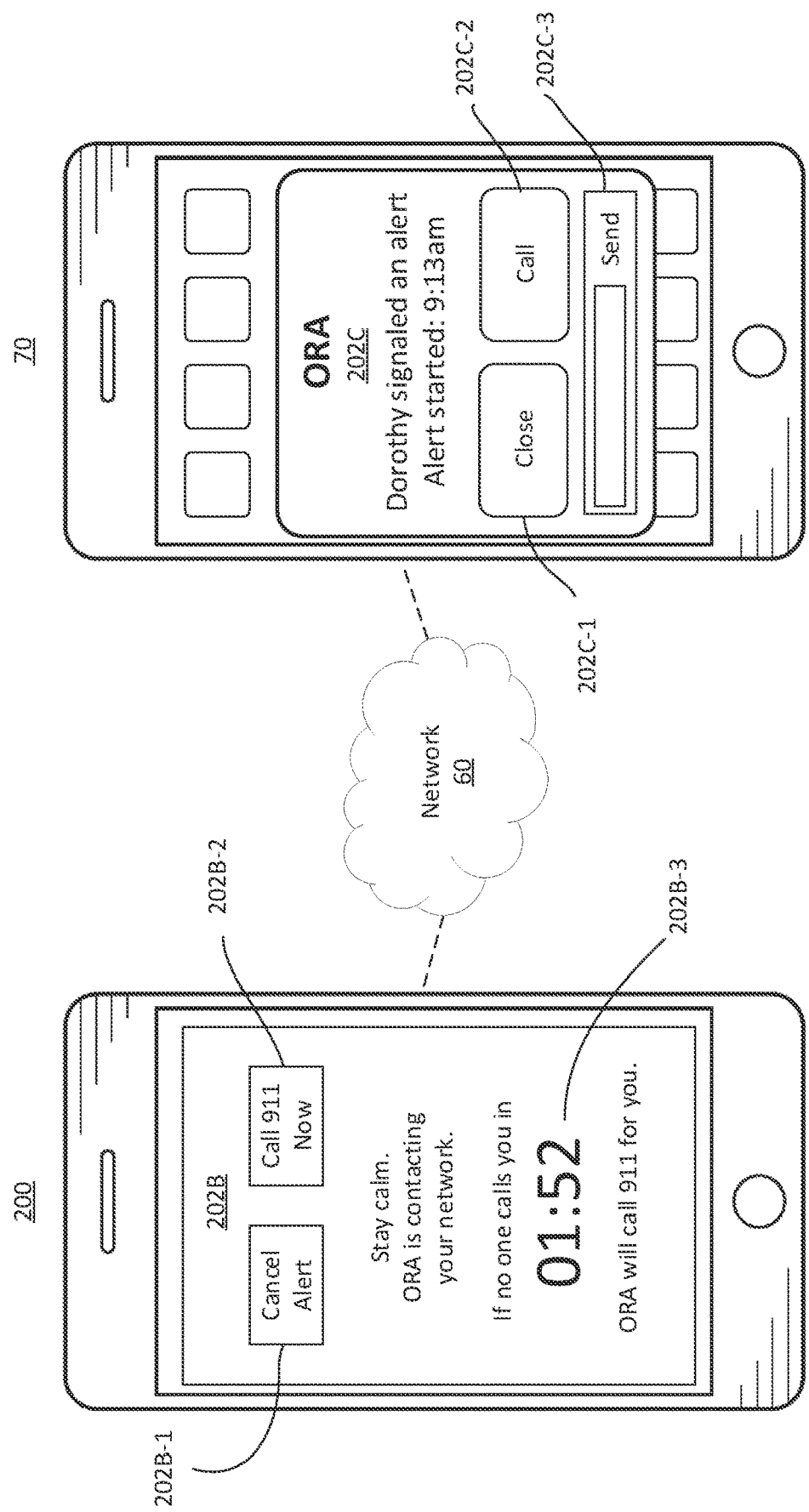
FIG. 6 depicts the mobile device of FIG. 1 making a status check request to a third-party contact device.

FIG. 6 depicts mobile device 200 sending a status check request to a contact device 70, according to a non-limiting embodiment. FIG. 6 shows screen captures of respective applications 202 running on devices 200, 70, in communication over network 60.

After initiation of a status check request from mobile device 200, mobile device 200 displays a status check request user interface 202B. Interface 202B includes a cancel button 202B-1 for cancelling the status check request, an emergency button 202B-2 for calling an emergency service 62 immediately, such as an emergency dispatch service, and a countdown timer display 202B-3 indicating a countdown time until an emergency service 62 will be called automatically. The alert device 100 may additionally include a countdown timer (not shown) in firmware 160 for determining whether to initiate telephony to emergency service 62.

After receipt of a status check request on contact device 70, contact device 70 displays a status check notification user interface 202C. Interface 202C includes close button 202C-1 for closing the interface 202C, a call button 202C-2 for calling the mobile device 200 issuing the status check request, and a messaging interface 202C-3 for messaging the mobile device 200 as a short message service (SMS) or as a direct message through applications 202 running on respective devices 200, 70.

Figure 7B:
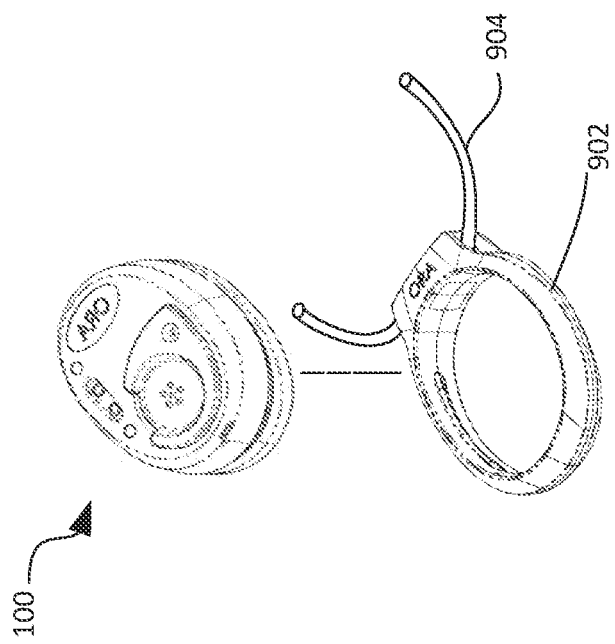
FIG. 7B is an assembly diagram of the alert device of FIG. 1 assembled into a wearable loop member.
Figure 7A:
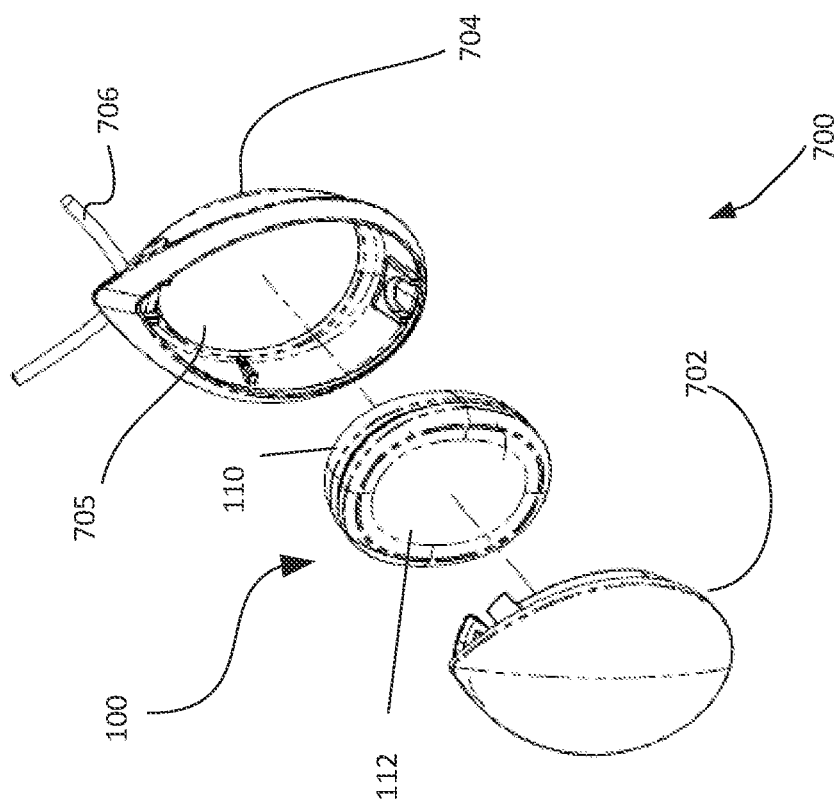
FIG. 7A is an assembly diagram of the alert device of FIG. 1 assembled into an article of jewelry.

FIGS. 7A and 7B depict example embodiments in which the alert device 100 is made into a wearable article. FIG. 7A is an assembly diagram of the alert device 100 being assembled into an article of jewelry 700, according to a non-limiting embodiment. The article of jewelry 700 includes fascia portion 702 and pendant portion 704. In the present embodiment, the alert device 100 is shaped such that fascia portion 702 can be releasably coupled over the front chassis 112 of the alert device 100 to attach with pendant portion 704 by a snap mechanism. The fascia portion 702 provides ornamentation to the alert device 100.

The pendant portion 704 includes an opening 705 which thus allows the rear chassis 110 of the alert device 100, and the peripheral components such as the alert button 102, to be accessible through pendant portion 704. In this way, the alert device 100 can be worn by loop 706 around the neck of an individual, discreetly disguised as an article of jewelry 700, with the alert button 102 on the alert device 100 out of sight, but readily accessible, from opening 705 of the pendant portion 704, the rear chassis 110 being oriented toward the individual. In the present embodiment, the loop 706 includes a cord. In other embodiments, the loop 706 may include a chain, string, or other flexible member wearable around an individual's neck. In some embodiments, the loop 706 includes a chain having a clasp. In some embodiments, the clasp includes two magnetic portions which are separable to unloop the chain. As a further example, the clap may include two hemispheric magnetic portions attached by clips to the chain.

Other embodiments in which the alert device 100 is assembled into a wearable article are contemplated. For example, in other embodiments, the loop 706 may be on the fascia portion 702 to provide for wearing around the neck of an individual. In other embodiments, the wearable article may enclose or partially enclose the alert device 100 while allowing the alert device 100 to be worn with its alert button 102 concealed.

FIG. 7B is an assembly diagram of the alert device 100 being assembled into a wearable loop member 902, according to a non-limiting embodiment. The alert device 100 is shaped such it can be releasably coupled with loop member 902, which includes a loop 904 for wearing around an individual's neck. In other embodiments, the alert device 100 may be fastened, glued, or otherwise fixed into loop member 902.

Figure 8:
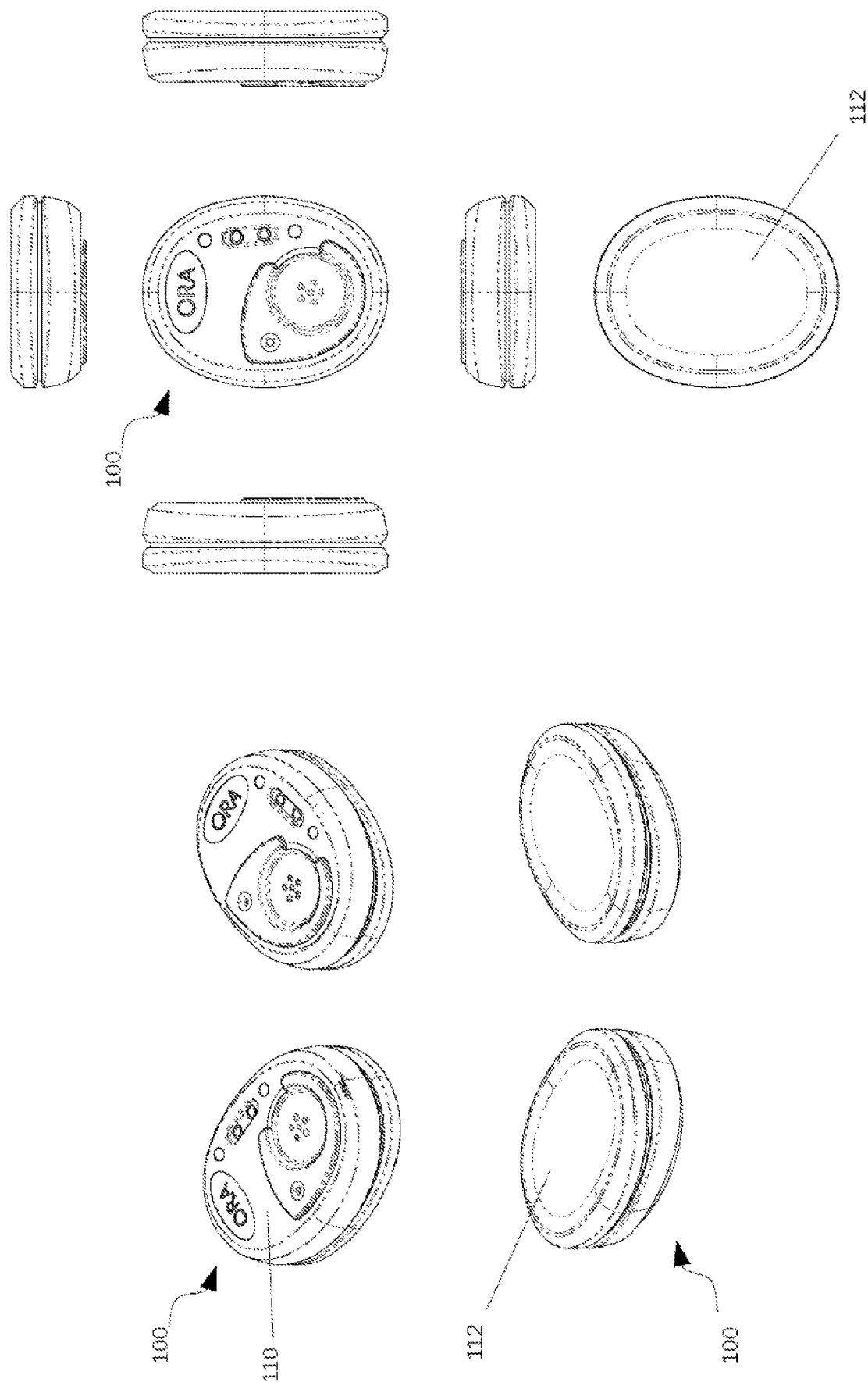
FIG. 8 provides additional views of the alert device of FIG. 1.

FIG. 8 provides additional views of the alert device 100, and further indicating front chassis 112 and rear chassis 110.

Figure 9:
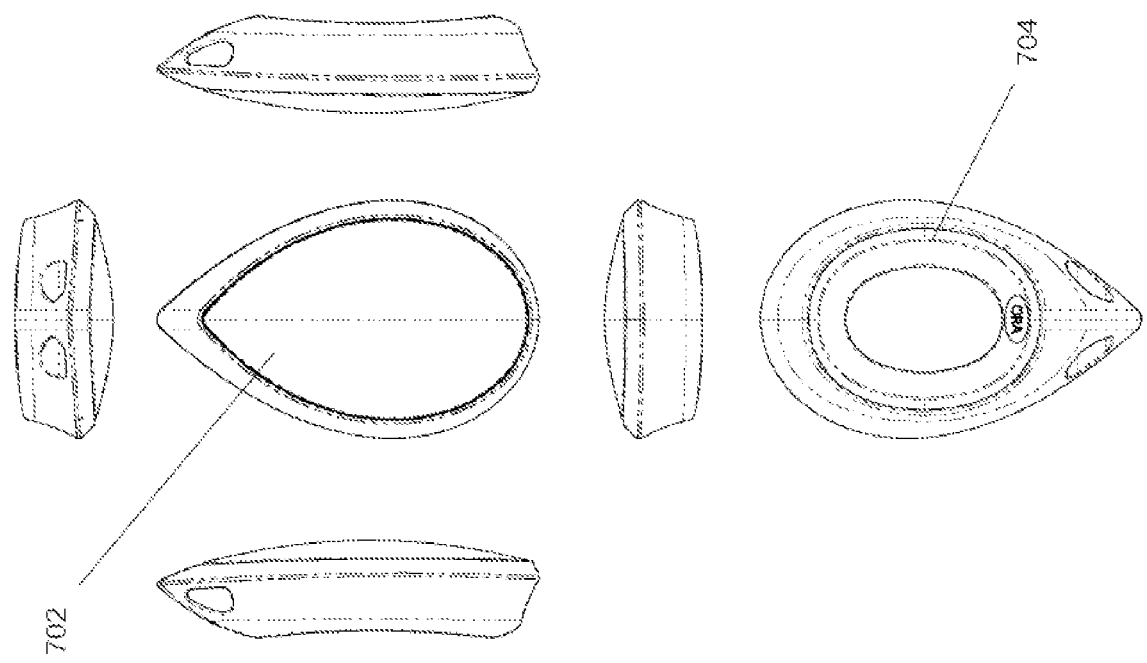
FIG. 9 provides additional views of the article of jewelry of FIG. 7A.
Figure 9:
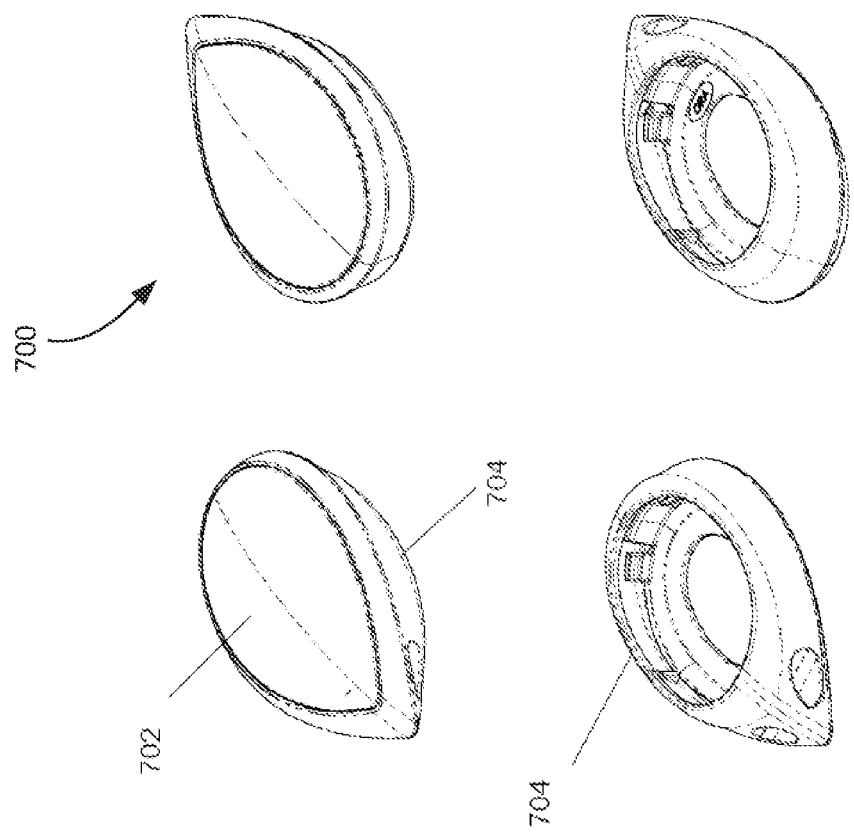

FIG. 9 provides additional views of the article of jewelry 700, and further indicating fascia portion 702 and pendant portion 704.

Figure 10:
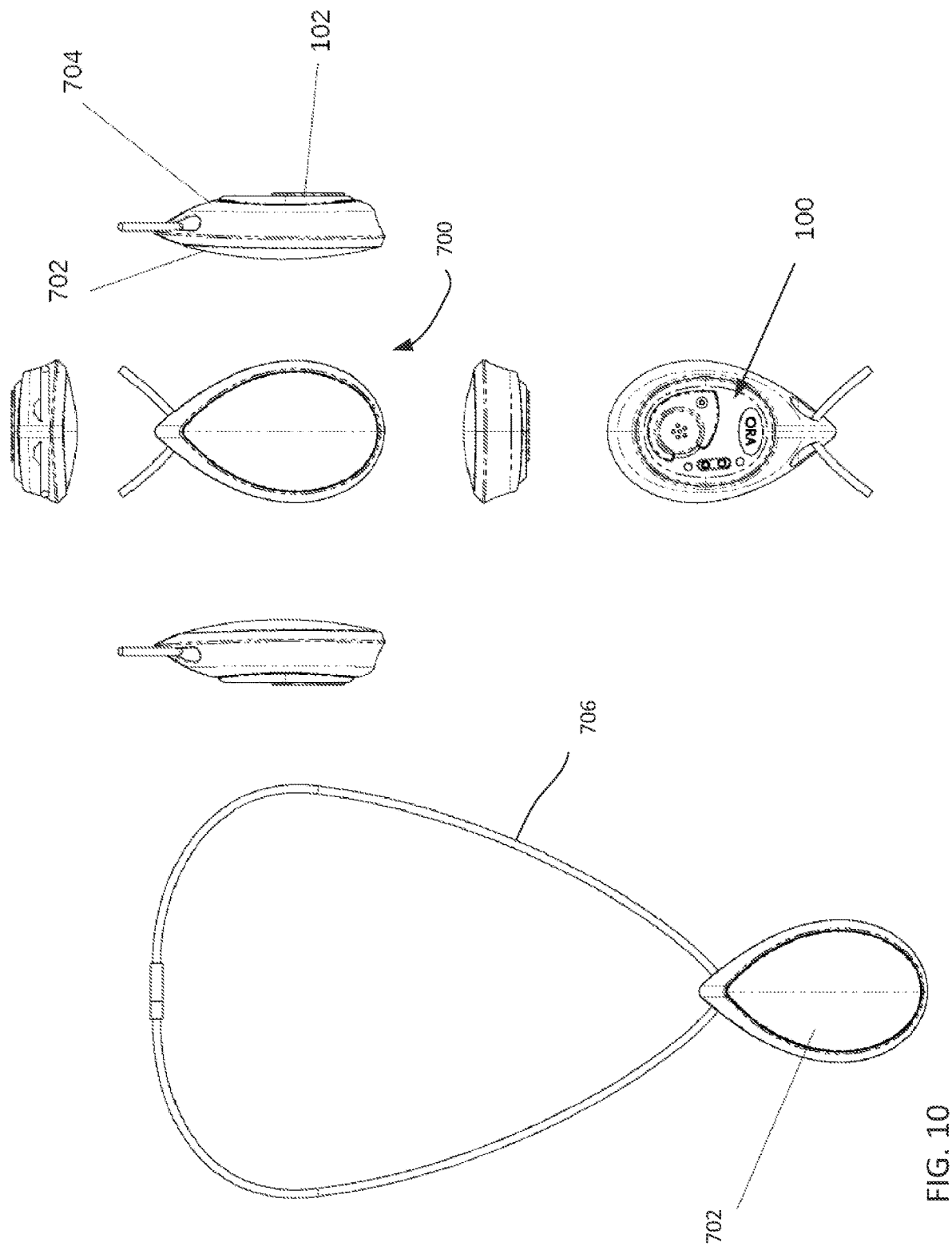
FIG. 10 provides additional views of the alert device of FIG. 1 assembled into the article of jewelry of FIG. 7A.

FIG. 10 provides additional views of the alert 100 assembled into the article of jewelry 700, and further indicating fascia portion 702, pendant portion 704, loop 706, and the alert device 100 having alert button 102.

Figure 11:
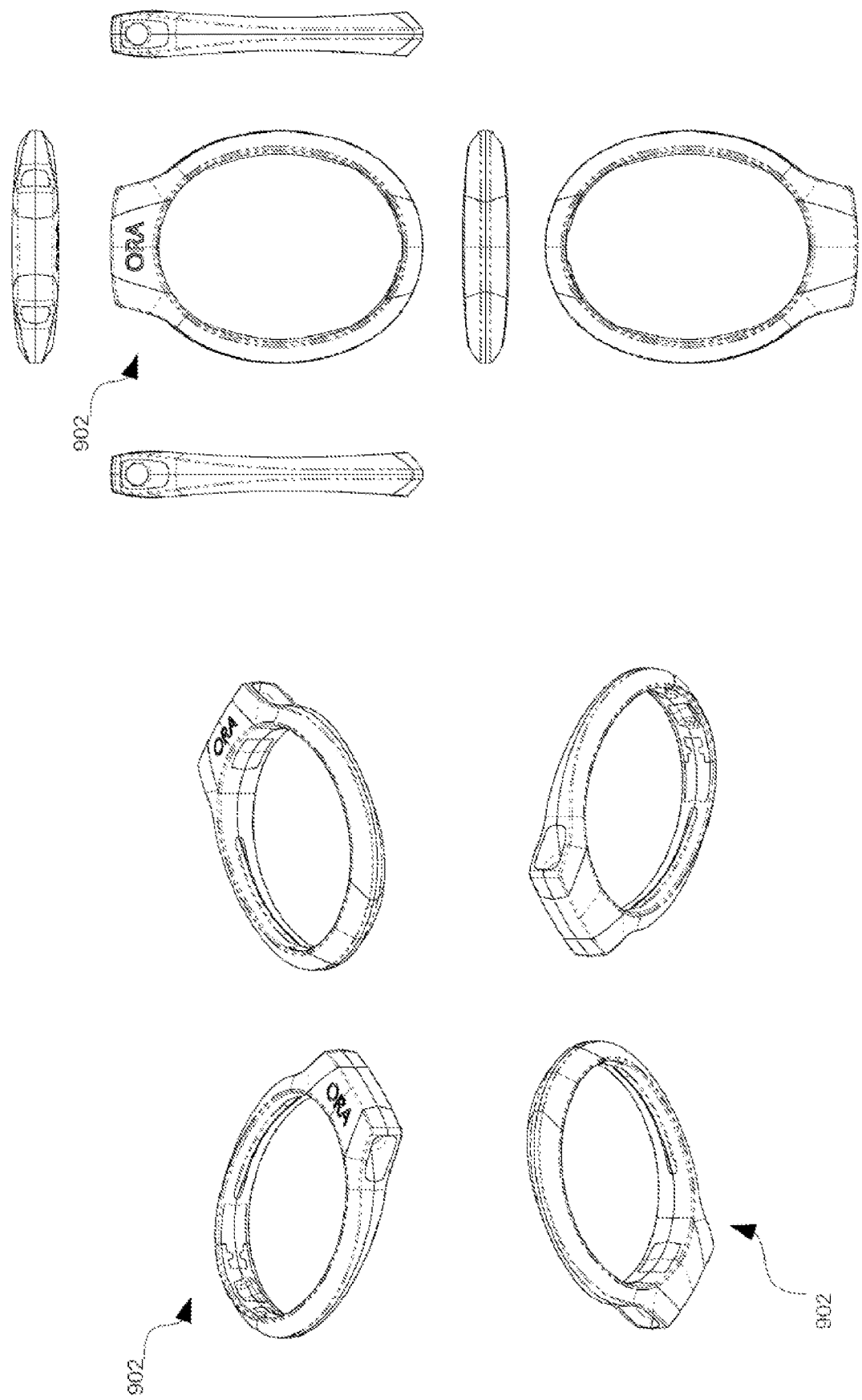
FIG. 11 provides additional views of the wearable loop member of FIG. 7B.

FIG. 11 provides additional views of the wearable loop member 902.

Thus, it can be seen from the above that an alert device can be provided as part of a low-power mobile telephony alert system. The alert device uses a low-power communication link to transmit status data from the alert device to the mobile device, and uses a telephony-enabled communication link to use the telephony capability of the mobile device while the mobile device is in locked mode, thereby overcoming such restrictions against low-power communication links. When a trigger indicating that the individual is distressed occurs, the alert device can cause the mobile device to initiate a status check request to third party contact devices, and can initiate telephony from the mobile device to an emergency service. The alert device can be made compact and incorporated into an article of jewelry or a wearable loop member for discrete wear.

In some embodiments, in place of telephony to an emergency service, an emergency service may be contacted by way of a Voice Over Internet Protocol (VOIP) call, a video call, text messaging, data calls, or other means of communication.

In some embodiments, the alert device and mobile device may be in communication by means other than a BLE and BTC link, including Wi-Fi, near-field-communication (NFC), or other connection, which provides for communication between the two devices and which permits the alert device to cause the mobile device to make external communications to seek assistance from third parties.

In some embodiments, the alert device may be in communication with telephony-enabled base station. In such embodiments, the alert device may be configured to initiate telephony from the telephony-enabled base station to alert an emergency service. In some of such embodiments, the alert device may be in communication with the base station by radio frequency (RF) or another long-range communication link.

In some embodiments, an indication that the individual is distressed can be determined by additional triggers. For example, where the alert device includes a microphone or other sound recorder, a trigger may be recognized when particular sounds are detected. As another example, a trigger may be recognized where a maintenance button has not been pressed for a pre-determined length of time. As another example, where the alert device includes a heartrate monitor, a trigger may be recognized where the wearer's heartrate drops below a threshold or rises above a threshold. Similarly, where the alert device includes a blood pressure sensor, a trigger may be recognized where the wearer's blood pressure drops below a threshold or rises above a threshold.

In still other embodiments, the mobile device may comprise a smartphone that may have telephony initiated by a low-power communication link such as a BLE connection. In such embodiments, the mobile device may be in communication with the alert device via a single communications link in which the alert device can cause the mobile device to initiate a telephone call or other communication to seek assistance.

In still other embodiments, the alert device may be incorporated into a bracelet, watch, or other article to be worn on an individual's person.

The scope of the claims should not be limited by the embodiments set forth in the above examples, but should be given the broadest interpretation consistent with the description as a whole.

The invention claimed is:

1. An alert device for initiating telephony from a mobile device in locked mode, the alert device comprising:
 a communication interface configured to:
  establish a first paired connection with the mobile device, the mobile device running a status data monitoring application, the first paired connection including a low-power communication link having privileged access to the status data monitoring application for recording status data from the alert device to the mobile device, the low-power communication link configured for continuous low-energy transmission of status data from the alert device to the status data monitoring application;
  establish a second paired connection with the mobile device distinct from the first paired connection, the second paired connection including a Bluetooth Classic (BTC) connection having privileged access to initiate telephony from the mobile device in locked mode, the BTC connection configured for initiating a telephony call from the mobile device in response to recognition of a trigger represented in the status data from the alert device, wherein the alert device functions as a master in a master-slave BTC connection, wherein the second paired connection includes a hands-free profile (HFP) providing privileged access for initiation of telephony, and wherein a link key is stored by both the alert device and the mobile device for authenticating the paired connection; and
  transmit the status data from the alert device to the mobile device, via the first paired connection, for collection by the status data monitoring application;
 a memory storage unit for storing programming instructions and the status data; and
 a processor in communication with the communication interface and memory storage unit, the processor configured to:
  recognize the trigger represented in the status data, and, responsive to recognition of the trigger, initiate, via one of the first paired connection and the second paired connection, a status check request from the mobile device to at least one third party contact device, the status check request having an expiry rule;

identify satisfaction of the expiry rule of the status check request, and, responsive to satisfaction of the expiry rule, connect to the mobile device from locked mode via the second paired connection; and initiate, via the second paired connection, telephony from the mobile device to a third-party emergency service.

2. The alert device of claim 1, wherein the alert device further comprises a motion sensor, wherein the status data comprises motion sensor data, and wherein the trigger comprises the status data indicating inactivity of the alert device for a pre-determined length of time.

3. The alert device of claim 1, wherein the alert device further comprises an alert button, and wherein the trigger comprises the status data indicating a pressed state of the alert button.

4. The alert device of claim 3, wherein the alert device comprises a wearable article having an opening for providing concealed access to the alert button of the alert device.

5. The alert device of claim 4, wherein the wearable article comprises a fascia portion and a pendant portion releasably attachable to enclose the alert device, the fascia portion providing ornamentation to the alert device, and the pendant portion concealing the alert button and providing a loop for wearing the alert device.

6. The alert device of claim 1, wherein the expiry rule comprises lapsation of a countdown timer.

7. A method for initiating telephony from a mobile device in locked mode using an alert device, the method comprising:

pairing the alert device with the mobile device via a first paired connection, the mobile device running a status data monitoring application, the first paired connection including a low-power communication link having privileged access to the status data monitoring application for recording status data from the alert device to the mobile device in locked mode, the low-power communication link configured for continuous low-energy transmission of status data from the alert device to the status data monitoring application;

pairing the alert device with the mobile device via a second paired connection distinct from the first paired connection, the second paired connection including a Bluetooth Classic (BTC) connection having privileged access to initiate telephony from the mobile device in locked mode, the BTC connection configured for initiating a telephony call from the mobile device in response to recognition of a trigger represented in the status data from the alert device;

transmitting status data from the alert device to the mobile device, via the first paired connection, for collection by the status data monitoring application;

responsive to recognition of the trigger represented in the status data, initiating, via one of the first paired connection and the second paired connection, a status check request from the mobile device to at least one third party contact device, the status check request having an expiry rule;

responsive to satisfaction of the expiry rule of the status check request, connecting to the mobile device from locked mode via the second paired connection; and initiating, via the second paired connection, telephony from the mobile device to a third-party emergency service, wherein the alert device functions as a master in a master-slave BTC connection, wherein the second paired connection includes a hands-free profile (HFP) providing privileged access for initiation of telephony, and wherein a link key is stored by both the alert device and the mobile device for authenticating the paired connection.

8. The method of claim 7, wherein the expiry rule comprises lapsation of a countdown timer.

9. The method of claim 7, wherein the status data comprises motion sensor data from a motion sensor on the alert device, and wherein recognition of the trigger represented in the status data comprises recognizing inactivity of the alert device for a pre-determined length of time.

10. The method of claim 7, wherein the status data comprises pressed state data from an alert button on the alert device, and wherein recognition of the trigger represented in the status data comprises a pressed state of the alert button.

11. A low-power mobile telephony alert system comprising:

a mobile device;
at least one third party contact device;
an emergency service; and
an alert device for initiating telephony from the mobile device in locked mode to the emergency service, the alert device comprising:

a communication interface configured to:

establish a first paired connection with the mobile device, the mobile device running a status data monitoring application, the first paired connection comprising a low-power communication link having privileged access to the status data monitoring application for recording status data from the alert device to the mobile device in locked mode, the low-power communication link configured for continuous low-energy transmission of status data from the alert device to the status data monitoring application;

establish a second paired connection with the mobile device distinct from the first paired connection, the second paired connection comprising a Bluetooth Classic (BTC) connection having privileged access to initiate telephony from the mobile device in locked mode, the BTC connection configured for initiating a telephony call from the mobile device in response to recognition of a trigger represented in the status data from the alert device; and transmit the status data from the alert device to the mobile device, via the first paired connection, for collection by the status data monitoring application;

a memory storage unit for storing programming instructions and the status data; and a processor in communication with the communication interface and memory storage unit, the processor configured to:

recognize the trigger represented in the status data, and, responsive to recognition of the trigger, initiate, via one of the first paired connection and the second paired connection, a status check request from the mobile device to at least one third party contact device, the status check request having an expiry rule;

identify satisfaction of the expiry rule of the status check request, and, responsive to satisfaction of the expiry rule, connect to the mobile device from locked mode via the second paired connection; and initiate, via the second paired connection, telephony from the mobile device to an emergency service, wherein the alert device functions as a master in a master-slave BTC connection, wherein the second paired connection includes a hands-free profile (HFP) providing privileged access for initiation of telephony, and wherein a link key is stored by both the alert device and the mobile device for authenticating the paired connection.

12. The system of claim 11, wherein the alert device further comprises a motion sensor, wherein the status data comprises motion sensor data, and wherein the trigger comprises the status data indicating inactivity of the alert device for a pre-determined length of time.

13. The system of claim 11, wherein the alert device further comprises an alert button, and wherein the trigger comprises the status data indicating a pressed state of the alert button. he alert button.

* * * * *